Sept. 1, 1936.    W. DIETERLE ET AL    2,052,754

SENSITIZING SILVER HALIDE EMULSIONS

Filed Jan. 11, 1932

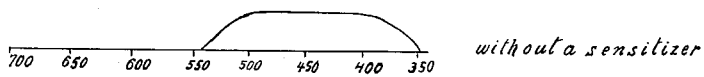

Fig. 1.    without a sensitizer

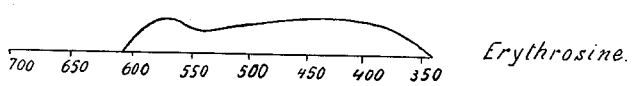

Fig. 2.    Erythrosine.

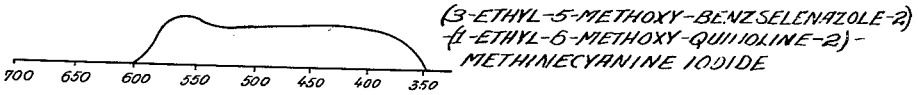

Fig. 5.    (3-ETHYL-5-METHOXY-BENZSELENAZOLE-2)
(1-ETHYL-6-METHOXY-QUINOLINE-2)-
METHINECYANINE IODIDE

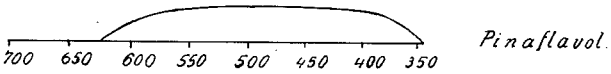

Fig. 3.    Pinaflavol.

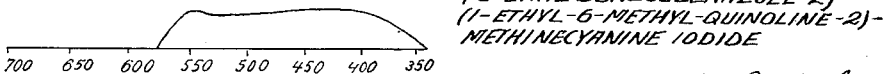

Fig. 4.    (3-ETHYL-BENZSELENAZOLE-2)-
(1-ETHYL-6-METHYL-QUINOLINE-2)-
METHINECYANINE IODIDE

Walter Dieterle,
Robert Walter,
Hermann Dürr,
Inventors:

By Philip S. Hopkins,
Attorney.

Patented Sept. 1, 1936

2,052,754

UNITED STATES PATENT OFFICE 2,052,754

SENSITIZING SILVER HALIDE EMULSIONS

Walter Dieterle and Robert Walter, Dessau in Anhalt, Germany, and Hermann Dürr, Binghamton, N. Y., assignors to Agfa Ansco Corporation, Binghamton, N. Y., a corporation of New York Application January 11, 1932, Serial No. 586,056
In Germany July 1, 1929

9 Claims. (Cl. 95—7)

Our present invention relates to sensitizing of photographic emulsions.

One of its objects is to provide such an emulsion the sensitivity of which is raised over the range of wave lengths to which the emulsion is normally sensitive. Further objects will be seen from the detailed specification following hereafter.

Reference is made to the accompanying drawing which illustrates the difference between the sensitizing capacity of known sensitizers and our new sensitizers.

We have found that a silver-halide emulsion containing a dye of the general formula

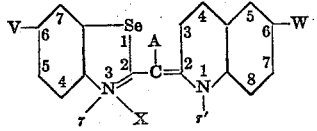

V and W=H, alkyl, oxalkyl, substituted amino groups, benzene halide,
$r$ and $r'$=alkyl,
A=H, alkyl,
X=halide, perchlorate, para-toluene sulfonate, alkylosulfate, nitrate,
is sensitive to the yellow and green region of the spectrum.

The emulsion thus attains a quite remarkable sensitiveness to the region of the spectrum comprising waves of about 500 to 580 $\mu$; and far exceeds, in respect of its intensity and clearness, the known sensitizers for blue-green, particularly pinaflavol. As compared with erythrosine the new sensitizers have the advantage that, with at least the same and frequently still higher color sensitiveness, there are lacking the gaps in the blue green which are characteristic of erythrosine. The new sensitizers unite the high absolute color sensitiveness of erythrosine with the favorable uninterrupted sensitiveness of pinaflavol for blue-green and green.

A further advantage of the [benzselenazole-(2)]-[quinoline-(2)]-methinecyanines resides in the very steep drop of the curve of sensitiveness towards the region of long wave length. This brings about a sensitiveness to red which is only low, so that there is a great insensitiveness towards the red light of the dark room. The [benzselenazole - (2) ] - quinoline - (2) ] - methinecyanines differ from the corresponding thiocyanines by displacing the range of sensitiveness of the silver-halide emulsions to which they are added for about 10 $\mu\mu$ towards the region of the longer waves of the spectrum. This occurs a displacement of the sensitiveness to bluish green to the sensitiveness to green and yellow green.

The [benzselenazole - (2) ] - [quinoline - (2) ]-methinecyanines are particularly suitable for the sensitizing of emulsion layers for producing part-color pictures, since, as compared with the known sensitizers, they have a better selection capacity for the same spectral region.

In general Formula 1 V and W may take any position in the benzene nuclei, however, the 5 and 6 position and the 6' and 7' position are preferred. V and W may represent alkyl, for instance, methyl, ethyl, etc., or an alkoxy group, for instance, a methoxy or ethoxy group, or an amino group both hydrogen atoms of which are replaced by alkyl or one of the hydrogen atoms being replaced by alkyl and the other by aryl and finally one of the hydrogen atoms being replaced by an acyl radical, or halide, or benzene. $r$ and $r'$ may be alkyl, for example methyl, ethyl, propyl, etc. A may represent H, methyl or ethyl. X can be any suitable anion that will precipitate the dye, for instance, a halide, paratoluene sulfonate, alkylosulfate, perchlorate, nitrate, or the like.

In the accompanying graph there are reproduced 5 spectrograms of the same silver-halide gelatine emulsion, No. 1 being without a sensitizer
No. 2 with erythrosine,
No. 3 with pinaflavol and
No. 4 with [3-ethyl-benzselenazol-(2)]-[1-ethyl - 6 - methyl-quinoline-(2)]-methinecyanine iodide (cf. Example 3)
No. 5 with [3-ethyl-5-methoxy-benzselenazole-(2)]-[1-ethyl- 6 -methoxy-quinoline-(2)]-methinecyanine iodide (cf. Example 5).

In these spectrograms the abscissae are graduated in millimicrons ($\mu\mu$) while the ordinates are graduated in divisions denoting the blackening of the tested film. The blackenings are taken by exposing the film in a diffraction grating spectrograph of Carl Zeiss, Jena, provided with a Rowland diffraction grating, and illuminating with a nitra lamp of 100 watt through a stage slot.

When comparing the curves the superiority of our new dyes will be easily seen. It is seen that the spectrogram of the emulsion sensitized with a selenopseudo-cyanine is distinguished, by a characteristic form, from the spectrogram of the emulsion which has not been sensitized or has been sensitized with another dyestuff. The practically uninterrupted sensitizing extends from 500 to 550 μμ and falls off with marked steepness towards 570 μμ.

The dyes are obtainable according to the desired solubility in form of the bromide, iodide, perchlorate etc. and are used in a quantity as usual for the known sensitizing dyes. This quantity amounts to about 10 to 20 milligrams per 1 kg. of emulsion ready for being cast which contains about 9 per cent of gelatin, 4.5 per cent of silver-halide, the rest being water. However we do not wish to limit our invention to the quantities just indicated, the most suitable amount will in each case be found by a few comparative experiments. The dyes may be added to the emulsion in form of solutions. Suitable solvents are the alcohols, for instance, methyl or ethyl alcohol which may be used anhydrous or diluted with water. The dyes are applied to the emulsion during any stage of its production, however, they are preferably added to the finished emulsion before being cast. The dyes may likewise be added by coating the emulsion with them or by bathing the finished photographic material in a bath in which the dye is dissolved. The dyes are suited for sensitizing an emulsion made according to the boiling process as well as for sensitizing an emulsion made according to the ammonia process.

The following examples serve to illustrate our invention.

Example 1.—For producing the dye [3-ethyl-benzselenazole-(2)]-[1 - ethyl - quinoline - (2)] - methinecyanine iodide corresponding to the formula

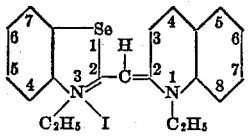

7 grams of 2-methylbenzselenazole-ethyl-iodide are boiled with 8 grams of 2-iodo-quinoline-ethyl-iodide and 100 cc. of alcohol. To the reaction mixture there are added 20 cc. of an alcoholic solution of caustic potassium of 4 per cent strength while heating is continued for about 10 minutes. The dye precipitates when cooling the orange red solution.

The alcoholic solution of the dye shows an absorption maximum at a wave length of about 490 μμ.

Incorporated in a gelatino-silver-bromide emulsion containing about 4 per cent of silver-iodide the dye imparts to it a range of sensitiveness from about 500 μμ to about 570 μμ with a maximum at about 534 μμ.

Example 2.—For producing the dye [3-methyl-benzselenazole-(2)]-[1-ethyl-quinoline-(2)] - α - methyl-methinecyanine iodide corresponding to the formula

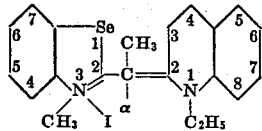

7 grams of 2-ethyl-benzselenazole-methyl-iodide and 8 grams of 2-iodo-quinoline-ethyl-iodide in 100 grams of boiling alcohol are mixed with 20 cc. of an alcoholic solution of caustic potassium of 4 per cent strength. After cooling the dye precipitates in form of orange colored needles.

The alcoholic solution of the dye shows an absorption maximum at a wave length of about 490 μμ.

Incorporated in a gelatino-silver-bromide emulsion containing about 4 per cent of silver-iodide the dye imparts to it a range of sensitiveness from about 500 μμ to about 570 μμ with a maximum at about 535 μμ.

Example 3.—For producing the dye [3-ethyl-benzselenazole-(2)]- [1-ethyl - 6 - methyl-quinoline-(2)]-methinecyanine iodide corresponding to the formula

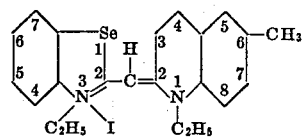

to the boiling solution of 7 grams of 2-methyl-benzselenazole-ethyl-iodide and 8.5 grams of 2-iodo-p-toluquino-ethyl-iodide in 100 cc. of alcohol, there are gradually added 20 cc. of an alcoholic solution of caustic potassium of 4 per cent strength. The dye is precipitated by cooling. It crystallizes from alcohol in form of orange colored little rods.

The alcoholic solution of the dye shows an absorption maximum at a wave length of about 495 μμ.

Incorporated in a gelatino-silver-bromide emulsion containing about 4 per cent of silver-iodide the dye imparts to it a range of sensitiveness from about 500 μμ to about 575 μμ, with a maximum at about 535 μμ.

Example 4.—For producing the dye [3-ethyl-benzselenazole-(2)]-[1-ethyl-5.6 - benzo - quinoline-(2)]-methinecyanine iodide corresponding to the formula

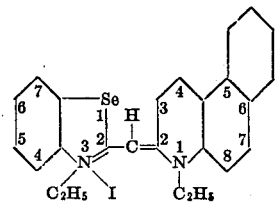

a mixture of 7 grams of 2-methyl-benzselenazole-ethyl-iodide and 9 grams of 2-iodo-β-naphtho-quino-ethyl-iodide are boiled with 100 cc. of alcohol and then 20 cc. of an alcoholic solution of caustic potassium of 4 per cent strength are gradually added, whereat the dye separates in form of dark orange red crystals.

The alcoholic solution of the dye shows an absorption maximum at a wave length of about 510 μμ.

Incorporated in a gelatino-silver-bromide emulsion containing about 4 per cent of silver-iodide the dye imparts to it a range of sensitiveness from about 500 μμ to about 585 μμ with a maximum at about 550 μμ.

Example 5.—For producing the dye [3-ethyl-5-methoxy - benzselenazole - (2)] - [1 - ethyl - 6-methoxy - quinoline-(2)]-methinecyanine iodide corresponding to the formula

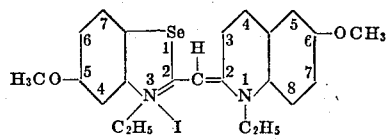

4 grams of 5-methoxy-2-methyl-benzselenazole-ethyl-iodide are boiled with 4.5 grams of 6-methoxy-2-iodo-quinoline-ethyl-iodide in 100 cc. of alcohol. After adding 10 cc. of an alcoholic solution of caustic potassium of 4 per cent strength and cooling the dye separates in form of orange red crystals.

The alcoholic solution of the dye shows an absorption maximum at a wave length of about 510 μμ.

Incorporated in a gelatino-silver-bromide emulsion containing about 4 per cent of silver-iodide the dye imparts to it a range of sensitiveness from about 500 μμ to about 595 μμ with a maximum at about 555 μμ.

Example 6.—For producing the dye [3-ethyl-6-methyl-benzselenazole-(2)]-[1-ethyl-8-methoxy-quinoline - (2)]-methinecyanine iodide corresponding to the formula

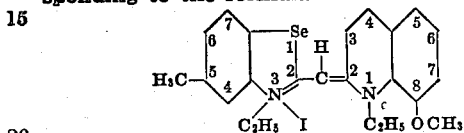

4 grams of 2.5-dimethyl-benzselenazole-ethyl-iodide and 4.5 grams of 8-methoxy-2-iodo-quinoline-ethyl-iodide are dissolved in hot alcohol. The solution is boiled and is while boiling mixed with 10 cc. of an alcoholic solution of caustic potassium of 4 per cent strength. While cooling the dye precipitates in form of orange red crystals.

The alcoholic solution of the dye shows an absorption maximum at a wave length of about 500 μμ.

Incorporated in a gelatino-silver-bromide emulsion containing about 4 per cent of silver-iodide the dye imparts to it a range of sensitiveness from about 500 μμ to about 545 μμ with a maximum at about 545 μμ.

Example 7.—For producing the dye [3-methyl-5-iodo-benzselenazole-(2)]-[1-ethyl - 6 - methyl-quinoline - (2)]-methinecyanine iodide corresponding to the formula

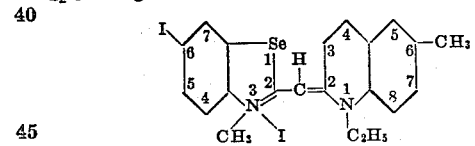

4.5 grams of 6-iodo-2-methyl-benzselenazole-ethyl-iodide and 4 grams of 2-iodo-p-tolu-quinoline-ethyl-iodide are dissolved in 100 cc. of hot alcohol. The boiling solution is mixed with 10 cc. of an alcoholic solution of caustic potassium of 4 per cent strength and heating is continued for 10 minutes. After cooling the dye separates in form of orange red crystals.

The alcoholic solution of the dye shows an absorption maximum at a wave length of about 495 μμ.

Incorporated in a gelatino-silver-bromide emulsion containing about 4 per cent of silver-iodide the dye imparts to it a range of sensitiveness from about 500 μμ to about 570 μμ with a maximum at about 535 μμ.

Example 8.—For the production of the dye [3-ethyl-5-ethoxy-benzselenazole-(2)]-[1-ethyl-6-ethoxy-quinoline-(2)]-methinecyanine iodide corresponding to the formula

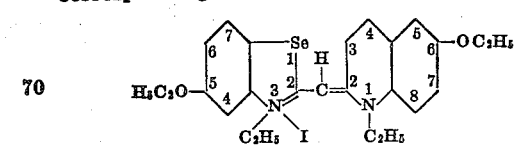

4.5 grams of 5-ethoxy-2-methyl-benzselenazole-ethyl-iodide and 4 grams of 6-ethoxy-2-iodo-quino-ethyl-iodide are heated with 100 cc. of alcohol until boiling and then mixed with 10 cc. of an alcoholic solution of caustic potassium of 4 per cent strength and kept boiling for about 10 minutes. The dye separates in form of reddish little rods.

The alcoholic solution of the dye shows an absorption maximum at a wave length of about 510 μμ.

Incorporated in a gelatino-silver-bromide emulsion containing about 4 per cent of silver-iodide the dye imparts to it a range of sensitiveness from about 500 μμ to about 590 μμ with a maximum at about 550 μμ.

Example 9.—For producing the dye [3-methyl-[naphtho-2'.1':4.5-selenazole]-(2)]-[1-ethyl-6 - methyl-quinoline-(2)]-methinecyanine chloride corresponding to the formula

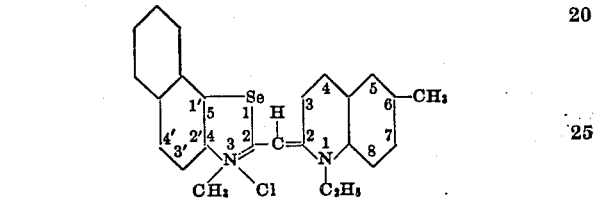

we operate as follows: 3.5 grams of 2-methyl-naphthoselenazole-ethyl-iodide and 4 grams of 2-iodo-p-tolu-quinoline-ethyl-iodide are boiled with 100 cc. of alcohol and then mixed with 10 cc. of an alcoholic solution of caustic potassium of 4 per cent strength, while boiling is continued for a short time. The separating dye is filtered and dissolved in concentrated hydrochloric acid. To this solution there are first added a concentrated solution of sodium chloride and then a concentrated aqueous solution of ammonia by which operation the dye is precipitated in form of large orange red flakes.

The alcoholic solution of the dye shows an absorption maximum at a wave length of about 505 μμ.

Incorporated in a gelatino-silver-bromide emulsion containing about 4 per cent of silver-iodide the dye imparts to it a range of sensitiveness extending from about 500 μμ to about 590 μμ with a maximum at about 550 μμ.

Example 10.—For producing the dye [3-ethyl-5-chloro-benzselenazole-(2)]-[1-ethyl-7-methyl-quinoline - (2)] - methinecyanine iodide corresponding to the formula

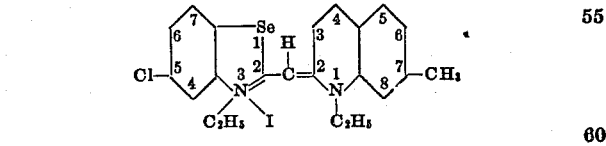

3.5 grams of 5-chloro-2-methyl-benzselenazole-ethyl-iodide and 4 grams of 2-iodo-7-methyl-quino-ethyl-iodide are boiled with 100 cc. of alcohol and to the boiling mixture there are added 10 cc. of an alcoholic solution of caustic potassium of 4 per cent strength. While cooling the reaction mixture the dye separates. It crystallizes from its alcoholic solution in form of small felted crystals.

The alcoholic solution of the dye shows an absorption maximum at a wave length of about 490 μμ.

Incorporated in a gelatino-silver-bromide emulsion containing about 4 per cent of silver-iodide the dye imparts to it a range of sensitiveness extending from about 500 μμ to about 563 μμ, with a maximum at about 532 μμ.

It is to be understood that our invention is not limited to the foregoing examples nor to the specific details given therein. Numerous other embodiments are possible and we contemplate as included within our invention all such modifications and equivalents as fall within the scope of the appended claims. So, for instance, the benzene nuclei may contain one or more substituents. The nomenclature used is arbitrary, but it is familiar to every chemist skilled in the art and has the advantage of clearness. Numbering of the selenazole bases is commenced from the selenium atom, and numbering of the dyes is commenced from the nitrogen atom. The formulæ of the dyes as given herein represent the molecular structure of our new dyes so far as known. If, however, in future it should become evident that the formulæ do not exactly correspond to the dyes this fact will not affect our invention since the dyes will be easily identified by the method of producing the same which has been fully described in the examples and is analogous to known methods.

What we claim is:

1. A photographic material comprising a silver-halide emulsion containing [3-ethyl-5-methoxy-benzselenazole-(2)]-[1-ethyl-6-methoxy-quinoline-(2)]-methinecyanine iodide corresponding probably to the formula

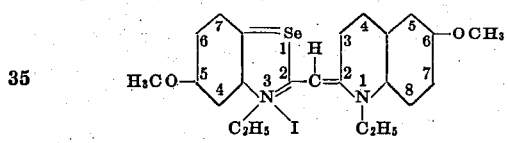

2. A photographic material comprising a gelatino-silver-bromide emulsion containing about 4% of silver iodide sensitized with [3-methyl-5-iodo-benzselenazole-(2)]-[1-ethyl-6-methyl-quinoline-(2)]-methinecyanine iodide corresponding to the formula

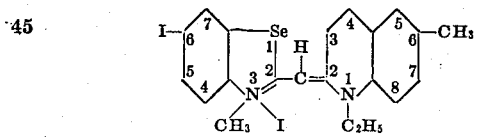

and having a range of sensitiveness from about 500 μμ to about 570 μμ with a maximum at about 535 μμ.

3. A photographic material comprising a gelatino-silver-bromide emulsion containing about 4% of silver iodide sensitized with [3-methyl-[naphtho-2′.1′:4.5-selenazole]-(2)]-[1-ethyl-6-methyl-quinoline-(2)]-methinecyanine-chloride corresponding to the formula

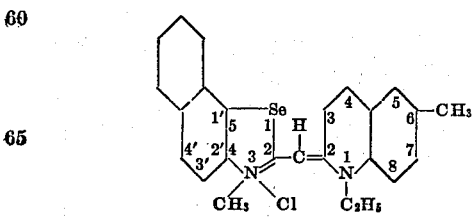

and having a range of sensitiveness from about 500 μμ to about 590 μμ with a maximum at about 550 μμ.

4. A photographic material comprising a silver halide emulsion which contains a [3-alkyl-benzselenazole-(2)]-[1-alkyl-quinoline-(2)]-methinecyanine salt.

5. A photographic material comprising a silver halide emulsion which contains a [3-alkyl-benzselenazole-(2)] - [1-alkyl-quinoline-(2)] - methinecyanine salt being substituted at the central carbon atom by an alkyl group.

6. A photographic material comprising a silver halide emulsion containing a [3-alkyl-benzselenazole-(2)] - [1-alkyl-quinoline-(2)] - methinecyanine salt selected from the group consisting of [3-ethyl-benzselenazole-(2)]-[1-ethyl-quinoline-(2)]-methinecyanine salts and [3-methyl - benzselenazole-(2)]-[1-ethyl-quinoline-(2)]-methinecyanine salts.

7. A photographic material comprising a gelatino-silver-halide emulsion sensitized with [3-methyl-6-iodo-benzselenazole-(2)]-[1 - ethyl - 6-methyl - quinoline - (2)]-methinecyanine iodide corresponding with the formula

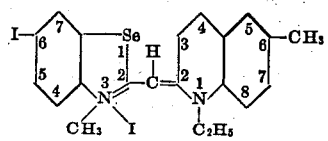

8. A photographic material comprising a gelatino-silver-halide emulsion sensitized with [3-methyl - [naphtho - 2′.1′:4.5 - selenazole] - (2)]-[ethyl-6-methyl-quinoline-(2)] - methinecyanine quino)-cyanine-chloride corresponding with the formula

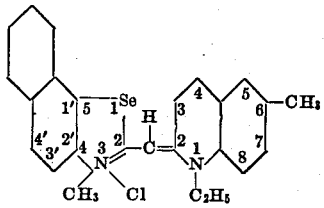

9. A photographic material comprising a silver-halide emulsion containing about 4% of silver iodide sensitized with [3-ethyl-5-methoxy-benzselenazole-(2)]-[1 - ethyl - 6-methoxy-quinoline-(2)]-methinecyanine iodide corresponding probably with the formula

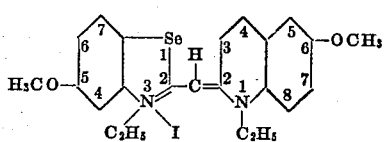

and having a range of sensitivity from about 500 μμ to about 585 μμ with a maximum at about 550 μμ.

WALTER DIETERLE.
ROBERT WALTER.
HERMANN DÜRR.